United States Patent
Song et al.

(10) Patent No.: US 12,125,375 B2
(45) Date of Patent: Oct. 22, 2024

(54) POWER DISTRIBUTION AND VEHICLE SELF-LEARNING-BASED TRUCK OVERLOAD IDENTIFICATION METHOD

(71) Applicant: BEIJING JIAOTONG UNIVERSITY, Beijing (CN)

(72) Inventors: Guohua Song, Beijing (CN); Xin Wang, Beijing (CN)

(73) Assignee: BEIJING JIAOTONG UNIVERSITY, Beijing (CN)

(*) Notice: Subject to any disclaimer, the term of this patent is extended or adjusted under 35 U.S.C. 154(b) by 245 days.

(21) Appl. No.: 17/774,651

(22) PCT Filed: Jun. 22, 2020

(86) PCT No.: PCT/CN2020/097335
§ 371 (c)(1),
(2) Date: May 5, 2022

(87) PCT Pub. No.: WO2021/088381
PCT Pub. Date: May 14, 2021

(65) Prior Publication Data
US 2022/0415166 A1    Dec. 29, 2022

(30) Foreign Application Priority Data

Nov. 6, 2019   (CN) .......................... 201911074735.8

(51) Int. Cl.
*G08G 1/01* (2006.01)
*B60W 40/13* (2012.01)
(Continued)

(52) U.S. Cl.
CPC ........... *G08G 1/0112* (2013.01); *B60W 40/13* (2013.01); *G07C 5/0808* (2013.01); *G08G 1/0129* (2013.01); *G08G 1/017* (2013.01)

(58) Field of Classification Search
CPC .... G08G 1/0112; G08G 1/0129; G08G 1/017; B60W 40/13; G07C 5/0808
(Continued)

(56) References Cited

U.S. PATENT DOCUMENTS

| 2014/0121867 A1* | 5/2014 | Tamai | B60W 10/08 180/65.265 |
| 2022/0016974 A1* | 1/2022 | Burjes | B60W 10/04 |

FOREIGN PATENT DOCUMENTS

WO   WO-2019037869 A1 *  2/2019  ............ B60W 10/06

* cited by examiner

*Primary Examiner* — Krishnan Ramesh
(74) *Attorney, Agent, or Firm* — Christopher M. Scherer; DeWitt LLP

(57) ABSTRACT

A power distribution and vehicle self-learning-based truck overload identification method, comprising: acquiring load identification data of a vehicle; calculating AOP values and STP values according to the load identification data of the vehicle; according to a plurality of sets of AOP values and STP values in a standard full-load state, constructing a power distribution curve of the vehicle in the standard full-load state; and comparing an AOP value during an actual operation process to a corresponding AOP value in the power distribution curve in the standard full-load state, and according to a comparison result, identifying whether the vehicle is overloaded. The method can show the operating states of overloaded vehicles in the road network in real time to provide convenience for oversize and overloading management. Loads of vehicles operating in the road network can be monitored in real time without additional equipment, thus improving the scope of overload identification.

10 Claims, 6 Drawing Sheets

(51) Int. Cl.
*G07C 5/08* (2006.01)
*G08G 1/017* (2006.01)
(58) Field of Classification Search
USPC ........................................................ 701/29.1
See application file for complete search history.

POWER DISTRIBUTION AND VEHICLE SELF-LEARNING-BASED TRUCK OVERLOAD IDENTIFICATION METHOD

CROSS-REFERENCE TO RELATED APPLICATIONS

The present application is the U.S. National Stage application of International Application No. PCT/CN2020/097335, filed Jun. 22, 2020, which International Application was published on May 14, 2021, as International Publication No. WO2021/088381. The International Application claims priority to Chinese Patent Application No. 201911074735.8, filed Nov. 6, 2019, the contents of which are incorporated herein by reference in their entireties.

FIELD

The present application relates to the technical field of vehicle overload detection, and in particular to a power distribution and vehicle self-learning-based truck overload identification method.

BACKGROUND

Highway transport is an important part of freight transport. According to a statistical yearbook of the National Bureau of Statistics, a total volume of freight transport in China in 2017 was 48,048.5 million tons, of which 36,868.58 million tons were highway transport, accounting for 76.7%. As means of highway transport, heavy trucks are responsible for heavy freight transport tasks. In the profit-seeking market economy environment, overloading and oversize phenomena are very common, which seriously endangers the safety of public transportation, and also poses a great threat to the safety of roads and bridges in China. In this regard, China has been unremittingly addressing truck overload and oversize problems, aimed at seeking effective curbing measures to protect road traffic safety. In 2016, the Ministry of Transport, the Ministry of Industry and Information Technology, the Ministry of Public Security, the State Administration for Industry and Commerce, and the General Administration of Quality Supervision, Inspection and Quarantine jointly issued Opinions on Further Improving the Governance of Illegal Modification and Oversize and Overload of Trucks, and carried out special governance actions on oversize and overloading. However, inspection and punishment of overloaded trucks are mainly focused on specific time periods and road sections, and fail to achieve all-round coverage, so the truck overloading problem is not curbed effectively. At about 18:10 on Oct. 10, 2019, a bridge lateral rollover accident occurred on a span bridge on Xigang Road at K135 of National Highway 312 in Wuxi, Jiangsu Province, killing three and injuring two persons. According to official preliminary analysis, the main reason for the bridge lateral rollover accident was serious overloading of a truck. Therefore, rapid and effective identification of loads of heavy trucks operating in real time in a road network has become very urgent.

At present, there are three main identification methods for truck loads: a first one is load identification based on a vehicle static weighting system, a second one is load identification based on a vehicle weight-in-motion (WIM) system, and a third one is load identification based on a vehicle on-board weighing system.

The vehicle static weighting system means that the load of a vehicle is measured when the vehicle is completely stationary, and such weighing apparatuses include three types: fixed, semi-fixed, and portable types. A fixed weighing system needs to be permanently installed on a concrete frame or platform; a semi-fixed weighing system uses permanent trenches and road facilities, with a portable weighing system installed during weighing operations; and the portable weighing system uses a weighing system laid on the road, assisted by a leveling board or ramp to ensure wheels are on the same horizontal plane.

The vehicle weight-in-motion system means that the weight of a vehicle is measured without interrupting the traffic flow. Compared to the traditional static weighing system, the weight-in-motion system does not require stopping the vehicle passing therethrough, which improves the efficiency of vehicle load identification and avoids excessively long waiting time. Currently, a widely used weight-in-motion system is composed of a pair of wired magnetic rings that detect a vehicle and measure a speed of the vehicle, and a force sensor that measures an instantaneous load applied by tires of the vehicle.

The vehicle on-board weighing system is based on a weighing system mounted on a vehicle body to obtain the load of a vehicle. Current researches on vehicle on-board weighing systems include three main branches. A first one is a direct method, in which a sensor is mounted between a vehicle frame and a cargo compartment, and the sensor group bears all the load, resulting in a shorter service life of the sensor. A second one is an indirect method, which detects and collects corresponding elastic deformation information of vehicle body structural parts such as a beam, an axle and a suspension after being loaded, and converts it into load information. With little influence on the load-bearing structure of the vehicle itself, this method currently represents a main research direction of vehicle on-board weighing systems. A third one relates to vehicles with a special lifting and loading mechanism, such as municipal garbage trucks, kitchen trucks and loaders, where changes in a load mass are tracked to measure a total load.

The above-mentioned truck load identification methods in the prior art have the following disadvantages:

Disadvantages of the above-mentioned vehicle static weighting system include: (1) the vehicle load can be measured only at a fixed position or at fixed time; (2) the vehicle passes at a slow speed, resulting in long-time queuing jams; (3) the identification system is huge in size, complex in structure and difficult to install; and (4) the purchase cost and maintenance cost of the identification system are high.

Disadvantages of the above-mentioned vehicle weight-in-motion system include: (1) the identification system is more complex in structure and difficult to install; (2) the purchase and maintenance costs are higher; (3) it can be installed only at fixed points, making it difficult for large-scale applications; and (4) the identification precision is greatly influenced by external factors (road smoothness, slope, vehicle tire pressure, etc.).

Disadvantages of the above-mentioned vehicle on-board weighing system include: the system identifies the vehicle load by elastic deformation of the vehicle body structural parts after being loaded, so the transmission sensitivity of the sensor directly influences the precision of vehicle load identification. The elastic deformation of the vehicle body structural parts is greatly influenced by vibrations of the vehicle body and the operating speed and acceleration of the vehicle, so the precision of load identification is affected. In addition, during long-term use, external factors such as fatigue and mechanical creep can cause irreversible interference with the sensor.

SUMMARY

An embodiment of the present application provides a power distribution and vehicle self-learning-based truck overload identification method to solve the problems in the prior art.

To achieve the above-mentioned objective, the present invention adopts the following technical solutions:

A power distribution and vehicle self-learning-based truck overload identification method includes:
acquiring load identification data of a vehicle, the load identification data including on-board diagnostic system data, global positioning system data, geographic information system data and vehicle information data;
calculating engine actual output power (AOP) values and scaled tractive power (STP) values of the vehicle according to the load identification data of the vehicle;
according to a plurality of sets of AOP values and STP values of the vehicle in a standard full-load state, constructing a power distribution curve of the vehicle in the standard full-load state; and
comparing an AOP value of the vehicle during an actual operation process to a corresponding AOP value in the power distribution curve in the standard full-load state, and according to a comparison result, identifying whether the vehicle is overloaded.

Preferably, acquiring load identification data of a vehicle, the load identification data including on-board diagnostic system data, position coordinates data, geographic information system data and vehicle information data includes:
acquiring, by an on-board diagnosis system, the on-board diagnostic system data of the vehicle, the on-board diagnostic system data including second-by-second operation time and traveling speed of the vehicle, and rotating speed and output torque information of an engine;
acquiring in real time, by a satellite positioning system, the position coordinates data of the vehicle, the position coordinates data including second-by-second longitude and latitude information;
acquiring, by a geographic information system, geographic information data of a road on which the vehicle operates, the geographic information data including slope, longitude and latitude, road grade and road network distribution information of the road on which the vehicle operates; and
acquiring, via a vehicle information database, specific attribute data of the vehicle, the specific attribute data including vehicle identification number, year of manufacture, manufacturer, total vehicle mass, emission standard, fuel type, engine model, engine displacement and maximum output power information.

Preferably, the STP is a scaled tractive power, which is defined as a power output by an engine per ton of mass moved, and the STP is calculated by the following formula:

$$STP = \frac{\left[\frac{d}{dt}(KE+PE) + F_{rolling}^v + \frac{1}{2}\rho_a C_D A(v+v_w)^2 v\right] m}{f_{scale}} \quad (1)$$

wherein in formula (1), $$\frac{d}{dt}(KE+PE), F_{rolling}^v, \frac{1}{2}\rho_a C_D A(v+v_w)^2 v$$

represent a power required for a change in kinetic/potential energy of the motor vehicle, a power required to overcome rolling resistance, and a power required to overcome air resistance, respectively,
wherein:
KE is the kinetic energy of the motor vehicle;
PE is the potential energy of the motor vehicle;
$F_{rolling}$ is the rolling resistance of the motor vehicle;
m is a mass of the motor vehicle (kg);
$f_{scale}$ is a mass scaling factor;
v is a traveling speed of the motor vehicle (m/s);
$V_w$ is a head-on wind speed of the motor vehicle (m/s);
$C_D$ is a drag coefficient, which is dimensionless;
A is a cross-sectional area of the vehicle (m$^2$); and
$\rho_a$ is an ambient air density, which is 1.207 kg/m$^3$ at 20° C.;
after development according to physical formulas of the kinetic energy, the potential energy and the rolling resistance, formula (1) is transformed into formula (2):

$$STP = \frac{\left\{\frac{d}{dt}\left[\frac{1}{2}m(1+\varepsilon_i)v^2 + mgh\right] + C_R mgv + \frac{1}{2}\rho_a C_D A(v+v_w)^2 v\right\} m}{f_{scale}} \quad (2)$$

wherein:
$\varepsilon_i$ is a rolling mass coefficient, representing an equivalent mass of a rotating part in a power train of the motor vehicle;
h is an altitude (m) of a location where the motor vehicle is traveling;
g is an acceleration of gravity, which is 9.81 m/s$^2$; and
$C_R$ is a rolling damping coefficient (dimensionless), which is related to the road material and tire type and pressure, and is generally between 0.0085 and 0.016; and
formula (2) is developed by calculating a derivative of a kinetic/potential energy part therein with respect to time t to obtain formula (3):

$$STP = \frac{mv[a(1+\varepsilon_i) + g(\text{grade}) + gC_R] + \frac{1}{2}\rho_a C_D A(v+v_w)^2 v}{f_{scale}} \quad (3)$$

wherein:
a is a traveling acceleration of the motor vehicle (m/s$^2$); and
grade is a road slope (the road slope is involved in the calculation when road network information includes slope information);

$$\text{STP bin}=n, \forall : \text{STP} \in [n-0.5, n+0.5) \quad (4)$$

Preferably, the STP values are divided into Bins intervals at equal intervals of 1 kw/t, the STP intervals being numbered −20, −19, . . . , −1, 0, 1, . . . 19, and 20, denoting STP intervals [−20.5, −19.5), [−19.5, −18.5), . . . , [−1.5, −0.5), [−0.5, 0.5), [0.5, 1.5), . . . , [18.5, 19.5), and [19.5, 20.5), respectively.

Preferably, the AOP is an engine actual output power, and the AOP is calculated by the following formula:

$$\begin{cases} AOP = Fv \\ v = wr \\ w = 2\pi n/60 \Rightarrow AOP = \eta n T_r/9550 \\ T_r = Fr \\ T_n = \eta T_r \end{cases} \quad (5)$$

wherein in the formula, AOP is the engine actual output power (kw), F is a driving force (N), v is a linear velocity (m/s), w is an angular velocity (rad/s), r is an engine arm length (m), n is an engine rotating speed (r/min), Tn is an actual engine torque (Nm), $T_r$ is an engine reference torque (Nm), and η is an engine actual torque output percentage (%).

Preferably, the method further includes:

continuously collecting according to set time intervals and calculating the AOP and STP values of the vehicle, adjusting corresponding points of AOP and STP forward and backward within 10 seconds with a step of 1 second, calculating correlation coefficients r (STP, AOP) between the AOP and the STP at different corresponding points, respectively, and using a corresponding point with the largest correlation coefficient to denote an actual corresponding relationship between the AOP and the STP;

$$r(STP, AOP) = \frac{Cov(STP, AOP)}{\sqrt{Var(STP)Var(AOP)}} \quad (6)$$

wherein in the formula, r (STP, AOP) is the correlation coefficient between the STP and the AOP, Cov (STP, AOP) is a covariance between the STP and the AOP, Var (STP) is a variance of the STP, and Var (AOP) is a variance of the AOP.

Preferably, denoising is performed on the AOP and STP values of the vehicle to determine a vehicle load identification condition; and with each Bins interval of STP as a time period, corresponding AOP values in each time period are determined according to the correlation coefficient r (STP, AOP), and a coefficient of variation CV of the AOP values of the vehicle within each time period is calculated, and a time period with the smallest coefficient of variation CV is selected as a time period for vehicle load identification;

$$\bar{x} = \sum_{i=1}^{N} x_i \quad (7)$$

$$CV = \frac{1}{\bar{x}}\sqrt{\frac{1}{N}\sum_{i=1}^{N}(x_i - \bar{x})}$$

in the formula, N is a total number of samples of the AOP values in the time period, $x_i$ is a power of an ith sample, $\bar{x}$ is a mean value of the N samples, and CV is the coefficient of variation of the AOP values in the time period.

Preferably, a relationship model between a power of the vehicle and a vehicle weight is constructed by an algorithm of the relationship model shown in formula (8) below:

$$AOP = a \times STP^2 + b \times STP + c \quad (8)$$

wherein in the formula, AOP is an actual output power, STP is a scaled tractive power, and a, b and c are parameters.

Preferably, according to a plurality of sets of AOP values and STP values of the vehicle in a standard full-load state, constructing a power distribution curve of the vehicle in the standard full-load state includes:

constructing a power and vehicle load relationship model shown in formula (9) below:

$$AOP = a \times STP^2 + b \times STP + \lambda \Delta m \times STP + c \quad (9)$$

wherein in the formula, AOP is the actual output power, STP is the scaled tractive power, a, b and c are parameters, Δm is a load weight, and λ is a mass correction coefficient; and according to load weights and actual STP values of the vehicle in the standard full-load state, calculating standard AOP values corresponding to the actual STP values of the vehicle in the standard full-load state based on the power and vehicle load relationship model shown in formula (9) above, and according to a plurality of sets of standard AOP values and actual STP values in the standard full-load state, constructing a power distribution curve of the vehicle in the standard full-load state, wherein vertical coordinates of the power distribution curve in the standard full-load state are the standard AOP values, and horizontal coordinates thereof are the actual STP values.

comparing an AOP value of the vehicle during an actual operation process to a corresponding AOP value in the power distribution curve in the standard full-load state, and according to a comparison result, identifying whether the vehicle is overloaded includes:

when there is a need to detect whether the vehicle is overloaded at current time within the time period for vehicle load identification, calculating an AOP value and a corresponding STP value of the vehicle at the current time, querying the power distribution curve in the standard full-load state according to the STP value at the current time to obtain a standard AOP value corresponding to the STP value at the current time in the power distribution curve in the standard full-load state, comparing the AOP value at the current time with the standard AOP value obtained from the query, determining the vehicle is overloaded at the current time if the AOP value at the current time is greater than the standard AOP value, or determining the vehicle is not overloaded at the current time if the AOP value at the current time is not greater than the standard AOP value.

As can be seen from the technical solutions provided in the embodiment of the present application, in the context of traffic big data, the embodiment of the present application establishes a vehicle self-learning-based overload identification algorithm by using data from a heavy truck operation information monitoring platform, and proposes a multiple correction model for overload identification system parameters. Compared with the traditional vehicle load identification method, the present application can monitor loads of vehicles operating in the road network in real time without additional equipment, thus greatly improving the scope of overload identification.

Additional aspects and advantages of the present application will be provided in part in the following description, as will become apparent from the following description, or as will be learned from the practice of the present application.

BRIEF DESCRIPTION OF THE DRAWINGS

To describe technical solutions in the embodiments of the present application more clearly, drawings to be used in description of the embodiments will be introduced briefly below. Obviously, the drawings described below are merely some embodiments of the present application, and those of ordinary skill in the art can obtain other drawings according to these drawings without creative work.

DETAILED DESCRIPTION OF THE EMBODIMENTS

Figure 1:
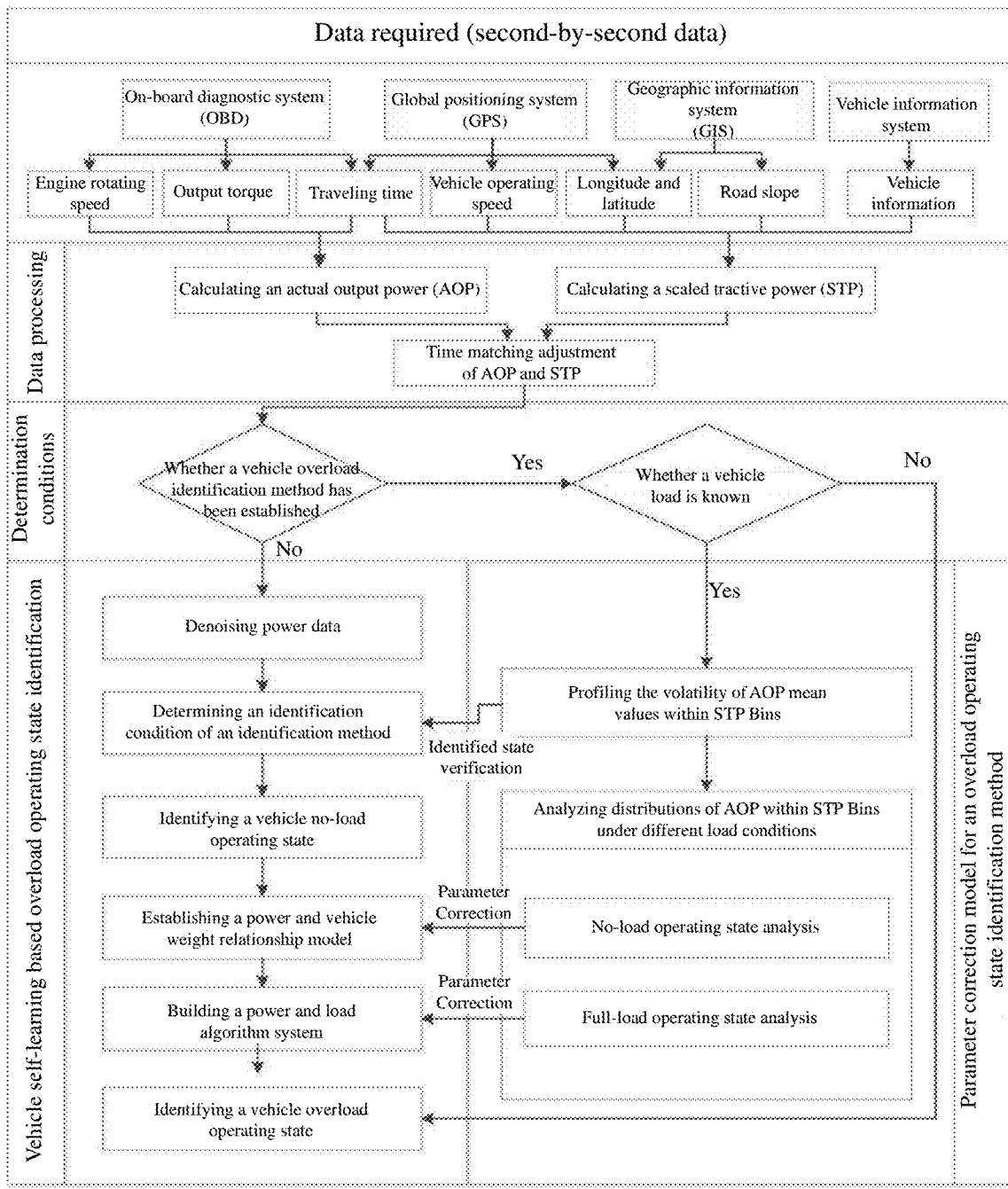
FIG. 1 is a schematic diagram of implementation principle of a power distribution and vehicle self-learning-based truck overload identification method provided in an embodiment of the present application.

Implementations of the present application are described in detail below, and examples of the implementations are shown in the drawings, in which same or similar reference numerals throughout represent same or similar elements or elements having same or similar functions. The implementations described below by reference to the drawings are exemplary and are only intended to explain the present application and cannot be construed as limiting the present application.

It may be understood by those skilled in the art that, unless otherwise stated, the singular forms "a/an", "one", "said" and "the" as used herein may also include plural forms. It should be further understood that the wording "include" as used in the specification of the present application means the presence of a described feature, integer, step, operation, element and/or components, but does not exclude the presence or addition of one or more other features, integers, steps, operations, elements, components and/or groups thereof. It should be understood that when an element is said to be "connected" or "coupled" to another element, it may be directly connected or coupled to another element, or there may be an intermediate element. In addition, the "connection" or "coupling" as used herein may include wireless connection or coupling. The wording "and/or" as used herein encompasses any unit and all combinations of one or more of associated listed items.

It may be understood by those skilled in the art that all terms as used herein (including technical terms and scientific terms) have the same meaning as generally understood by those of ordinary skill in the art to which the present application pertains, unless otherwise defined. It should also be understood that terms such as those defined in generic dictionaries should be understood to have meanings consistent with meanings in the context of the prior art and, unless defined as herein, are not interpreted in an idealized or overly formal sense.

To facilitate understanding of the embodiments of the present application, several specific embodiments will be further explained as examples in conjunction with the drawings, and the embodiments do not limit the embodiments of the present application.

The existing vehicle load identification methods have irreparable defects. Therefore, in embodiments of the present application, based on vehicle operating data (second-by-second speed, engine speed, and torque) acquired from an existing heavy truck online monitoring big data platform, differences of actual output power (AOP) distribution in a scaled tractive power (STP) interval are analyzed, and a heavy truck load identification algorithm is designed.

The present application constructs a vehicle overload identification method based on a heavy truck big data vehicle operation information monitoring platform. Denoising is performed on vehicle operation power data through supervised learning and cluster analysis; determination conditions of a vehicle load are determined based on volatility analysis of a vehicle output power; a heavy truck no-load operating state is autonomously identified by unsupervised learning; a deep learning network is built, and a power and vehicle weight relationship model is constructed; real-time dynamic operation information of vehicles in a road network under a standard full load is extracted by using a multiple data reconstruction algorithm; and an automatic correspondence algorithm is constructed to identify overloaded vehicles in the road network and perform characteristic data mining thereon.

Figure 2:
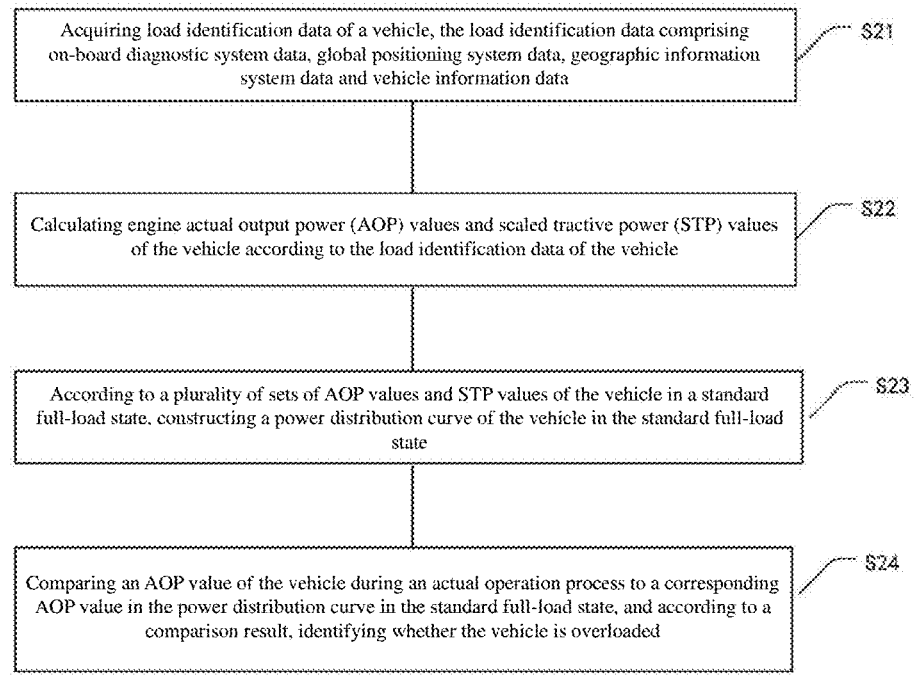
FIG. 2 is a processing flow diagram of a power distribution and vehicle self-learning-based truck overload identification method provided in an embodiment of the present application.

An embodiment of the present application proposes a power distribution and vehicle self-learning-based truck overload identification method. A schematic diagram of the implementation principle of the method is shown in FIG. 1, and a specific processing flow is shown in FIG. 2. The method includes the following processing steps:

Step S21, acquiring load identification data of a vehicle.

To establish a load identification method for trucks and other vehicles, it needs to acquire load identification data of a vehicle, the load identification data including on-board diagnostic system data, vehicle position coordinates data, geographic information system data and vehicle information data. With the enhancement of monitoring of heavy trucks in China, the heavy truck online monitoring big data platform has been initially established and gradually improved, to achieve real-time monitoring of vehicle operating states. Therefore, the above-mentioned vehicle load identification data can be obtained through the big data monitoring platform, without additional installation of related equipment.

On-Board Diagnostic System Data

An on-board diagnostics (OBD) system is a type of detection system developed for automobile fault diagnosis. The OBD system monitors, in real time, systems and components of the vehicle, such as an engine, a catalytic converter, a particulate trap, an oxygen sensor, an emission control system, a fuel system, and an EGR system, and then is coupled to an electronic control unit (ECU) of the vehicle through a relevant component. Therefore, vehicle second-by-second operation time, vehicle traveling speed, engine rotating speed and output torque and other information need to be acquired in real time by the OBD system.

Vehicle Position Coordinates Data

A global positioning system (GPS) is a positioning system for high-precision radio navigation based on satellites in the air. It can provide accurate geographic location, vehicle traveling speed, and precise time information anywhere globally and in near-Earth space.

The BeiDou satellite navigation system is a satellite navigation system built and operated independently by China. It can provide all-weather, all-time, high-precision positioning, navigation and time services to users worldwide.

Second-by-second precise longitude and latitude data of the vehicle is acquired in real time by a satellite positioning system such as an on-board GPS or an on-board BeiDou system.

Geographic Information System Data

A geographic information system (GIS) is a computer system with the ability to centralize, store, operate and display geographic reference information. It integrates computer database technology and computer graphics processing technology. Slope, longitude and latitude, road grade, road network distribution and other information of the road on which the vehicle operates is obtained by the GIS to calculate a scaled tractive power and display operation information of the vehicle in the road network in real time.

Vehicle Information Data

The vehicle information data is underlying static data of the big data monitoring platform, and is used to query specific attribute information of the vehicle. Vehicle identification number, year of manufacture, manufacturer, total vehicle mass, emission standard, fuel type, engine model, engine displacement, maximum output power and other information are acquired via a vehicle information database.

Step S22: calculating an engine actual output power (Actual Operating Power, AOP) and a scaled tractive power (STP) of the vehicle according to the load identification data of the vehicle.

The construction of a vehicle overload identification method system includes the following four parts: (1) calculating the AOP and the STP of the vehicle based on real-time operating data of the vehicle acquired from the big data platform; (2) establishing a time-optimal correspondence method between the AOP and the STP to eliminate a time gap between the AOP and the STP; (3) establishing a load identification method based on vehicle self-learning; and (4) building a parameter correction model for overload operating state identification.

Data for calculating the STP is obtained from the operation time and traveling speed of the vehicle provided by the on-board GPS and the road slope information provided by the GIS.

The STP is a scaled tractive power, which is defined as a power output by an engine per ton of mass moved (including self-weight) in kW/t (or W/kg). In physical theory, the STP takes into account several uses of the work done by the motor vehicle engine, including a change in kinetic energy, a change in potential energy, and overcoming rolling frictional resistance of the vehicle and overcoming air resistance, and its derivation process is as follows:

$$STP = \frac{\left[\frac{d}{dt}(KE+PE) + F^v_{rolling} + \frac{1}{2}\rho_a C_D A(v+v_w)^2 v\right]m}{f_{scale}} \quad (1)$$

wherein in formula (1), $$\frac{d}{dt}(KE+PE), F^v_{rolling}, \frac{1}{2}\rho_a C_D A(v+v_w)^2 v$$

represent a power required for the change in kinetic/potential energy of the motor vehicle, a power required to overcome the rolling resistance, and a power required to overcome the air resistance, respectively, wherein:

KE is the kinetic energy of the motor vehicle;
PE is the potential energy of the motor vehicle;
$F_{rolling}$ is the rolling resistance of the motor vehicle;
m is a mass of the motor vehicle (kg);
$f_{scale}$ is a mass scaling factor;
v is a traveling speed of the motor vehicle (m/s);
$v_w$ is a head-on wind speed of the motor vehicle (m/s);
$C_D$ is a drag coefficient, which is dimensionless;
A is a cross-sectional area of the vehicle (m$^2$); and
$\rho_a$ is an ambient air density, which is 1.207 kg/m$^3$ at 20° C.;

after development according to physical formulas of the kinetic energy, the potential energy and the rolling resistance, formula (1) can be transformed into formula (2):

$$STP = \frac{\left\{\frac{d}{dt}\left[\frac{1}{2}m(1+\varepsilon_i)v^2 + mgh\right] + C_R mgv + \frac{1}{2}\rho_a C_D A(v+v_w)^2 v\right\}m}{f_{scale}} \quad (2)$$

wherein:

$\varepsilon_i$ is a rolling mass coefficient, representing an equivalent mass of a rotating part in a power train of the motor vehicle;
h is an altitude (m) of a location where the motor vehicle is traveling;
g is an acceleration of gravity, which is 9.81 m/s$^2$; and
$C_R$ is a rolling damping coefficient (dimensionless), which is related to the road material and tire type and pressure, and is generally between 0.0085 and 0.016; and
formula (2) is developed by calculating a derivative of a kinetic/potential energy part therein with respect to time t to obtain formula (3):

$$STP = \frac{mv[a(1+\varepsilon_i) + g(\text{grade}) + gC_g] + \frac{1}{2}\rho_a C_D A(v+v_w)^2 v}{f_{scale}} \quad (3)$$

wherein:

a is a traveling acceleration of the motor vehicle (m/s$^2$); and
grade is a road slope (the road slope is involved in the calculation when road network information includes slope information);
STP values are divided into Bins intervals at equal intervals of 1 kw/t.

$$\text{STP bin}=n, \forall : \text{STP} \in [n-0.5, n+0.5) \quad (4)$$

The STP intervals are numbered −20, −19, . . . , −1, 0, 1, . . . 19, and 20, denoting STP intervals [−20.5, −19.5), [−19.5, −18.5), . . . , [−1.5, −0.5), [−0.5, 0.5), [0.5, 1.5), . . . , [18.5, 19.5), and [19.5, 20.5), as shown in Table 2.

TABLE 2

Classification of STP intervals

| STP Bin ID | STP interval |
| --- | --- |
| −20 | [−20.5, −19.5) |
| −19 | [−19.5, −18.5) |
| . | . |
| . | . |
| . | . |
| −1 | [−1.5, −0.5) |
| 0 | [−0.5, 0.5) |
| 1 | [0.5, 1.5) |
| . | . |
| . | . |
| 1.9 | [18.5, 19,5) |
| 20 | [19.5, 20.5) |

The AOP is calculated based on time, engine rotating speed, output torque and other data provided by the OBD system, and the AOP is an engine actual output power and is calculated by the following formula:

$$\begin{cases} AOP = Fv \\ v = wr \\ w = 2\pi n/60 \Rightarrow AOP = \eta n T_r/9550 \\ T_r = Fr \\ T_n = \eta T_r \end{cases} \quad (5)$$

In the formula, AOP is the engine actual output power (kw), F is a driving force (N), v is a linear velocity (m/s), w is an angular velocity (rad/s), r is an engine arm length (m), n is an engine rotating speed (r/min), $T_n$ is an actual engine torque (Nm), $T_r$ is an engine reference torque (Nm), and η is an engine actual torque output percentage (%).

Step S23: according to a plurality of sets of AOP values and STP values of the vehicle in a standard full-load state, constructing a power distribution curve of the vehicle in the standard full-load state.

First, it needs to establish a time-optimal correspondence between the AOP and the STP to eliminate a time gap between the AOP and the STP.

In the embodiment of the present application, the AOP and the STP of the vehicle are continuously collected according to set time intervals and values thereof are calculated. As the data sources for calculating the STP and the AOP is obtained from different collection devices, there is a time difference between the two data sources, and thus different vehicle operation modes are reflected at the same moment. The present application eliminates the time difference between the two data sources by adjusting the time alignment gap and calculating correlation coefficients r (STP, AOP) between the AOP and the STP using formula (6). Corresponding points of the AOP and the STP are adjusted forward and backward within 10 seconds with a step of 1 second, correlation coefficients between the AOP and the STP at different corresponding points are calculated respectively, and a corresponding point with the largest correlation coefficient is used to denote an actual corresponding relationship between the AOP and the STP.

$$r(STP, AOP) = \frac{Cov(STP, AOP)}{\sqrt{Var(STP)Var(AOP)}} \quad (6)$$

In the formula, r (STP, AOP) is the correlation coefficient between the STP and the AOP, Cov (STP, AOP) is a covariance between the STP and the AOP, Var (STP) is a variance of the STP, and Var (AOP) is a variance of the AOP.

The load identification method based on vehicle self-learning means that real-time vehicle operating data is acquired from the big data information platform, a vehicle no-load operating state is autonomously identified by unsupervised learning; a deep learning network is built to extract real-time dynamic operation information of vehicles in a road network under a standard full load, and an automatic correspondence algorithm is constructed to identify overloaded vehicles in the road network and perform characteristic data mining thereon. The specific construction method includes the following five parts: (1) denoising power data; (2) determining an identification condition of a vehicle load; (3) identifying a vehicle no-load operating state; (4) establishing a power and vehicle weight relationship model; (5) building a power and load algorithm system; and (6) constructing a method for identifying an overload operating state.

1. Denoising Actual Output Power Data

Figure 3:
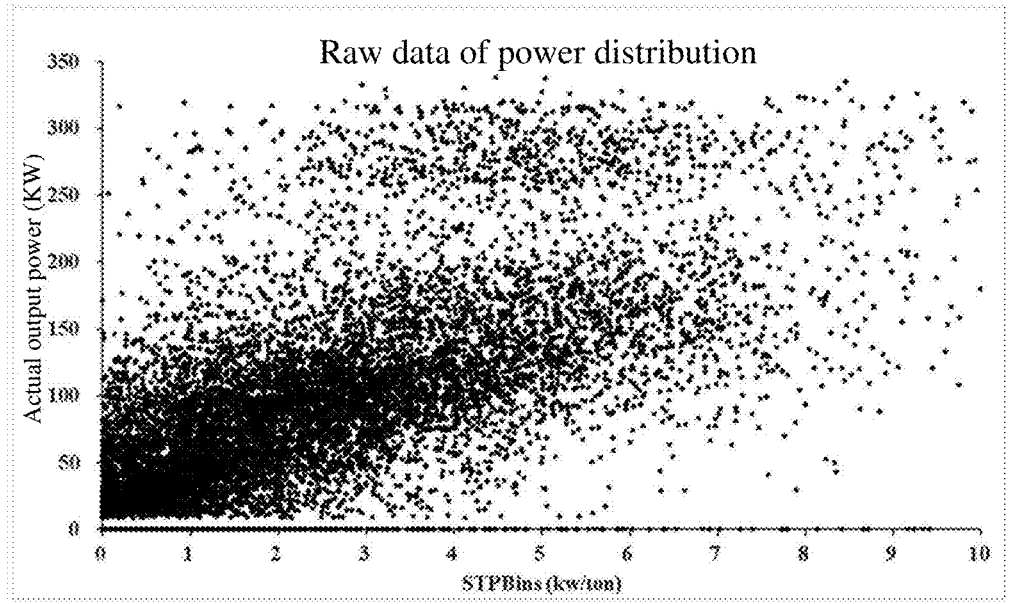
FIG. 3 is a schematic diagram of distribution of an actual output power in STP Bins provided in an embodiment of the present application.
Figure 4:
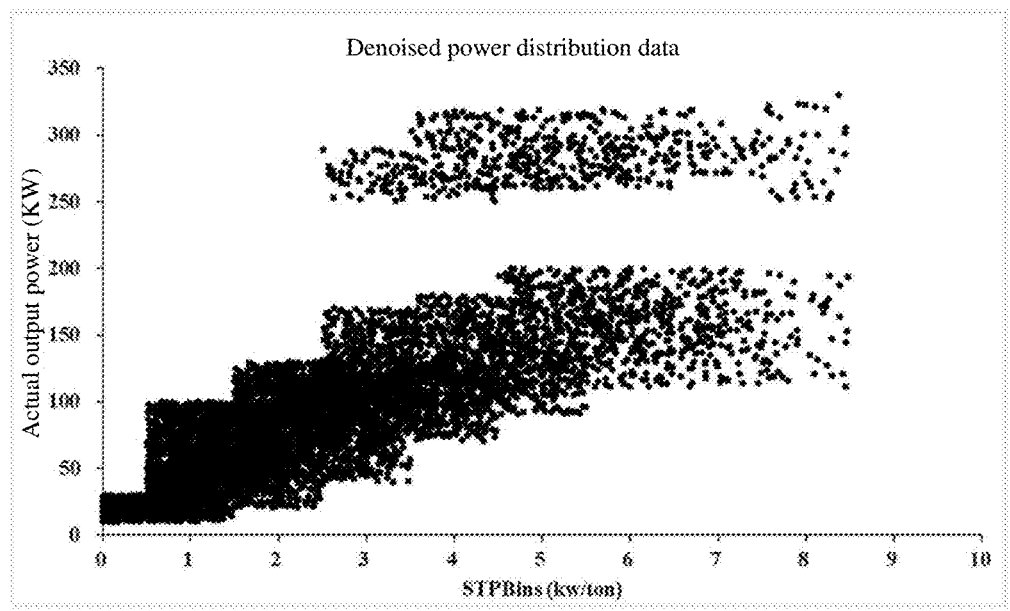
FIG. 4 shows a schematic diagram of distribution of a denoised actual output power in STP Bins provided in an embodiment of the present application.

There are data drift and data anomaly phenomena when the apparatus systems collect vehicle operating data, so in the present application, denoising is performed on the actual output power data, and sample frequencies in different power intervals are calculated by supervised learning and data cluster analysis to cover up power intervals with lower sample frequencies. FIG. 3 is a schematic diagram of distribution of the actual output power in STP Bins provided in an embodiment of the present application; and FIG. 4 shows a schematic diagram of distribution of the denoised actual output power in STP Bins.

2. Determining an Identification Condition of a Vehicle Load

Power distribution differences and volatility magnitudes of different load data intervals are analyzed to determine the vehicle load identification condition. STP values are divided into Bins intervals at equal intervals of 1 kw/t, as shown in formula (4). STP distribution is calculated by formula (7).

$$P_i = \frac{1}{N}\sum_{i=1}^{N} P_{in} \quad (7)$$

In the formula, $P_i$ is a mean value of actual output power in an interval i of the STP Bins, $P_{in}$ is an actual output power of an Nth sample in the interval i of the STP Bins, and N is a total number of samples in the interval i of the STP Bins.

Figure 5:
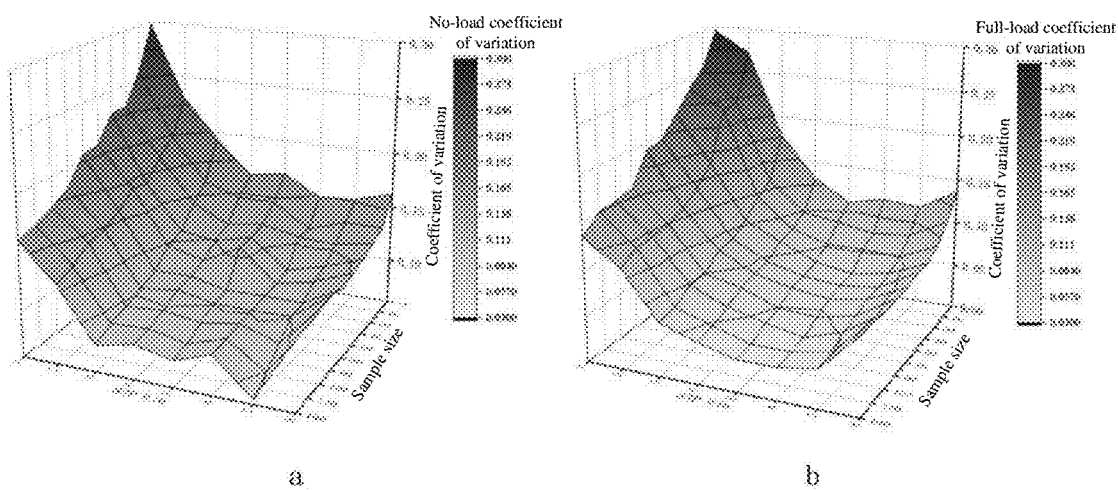
FIGS. 5a and 5b are schematic diagrams of AOP volatility in different scaled power intervals provided in an embodiment of the present application.

FIGS. 5a and 5b are schematic diagrams of AOP volatility in different scaled power intervals provided in an embodiment of the present application. To quantitatively analyze the volatility of AOP values within the STP Bins, each Bins interval is used as a time period, respectively. Corresponding AOP values in each time period (Bins interval) are determined according to the correlation coefficient r (STP, AOP).

A coefficient of variation CV of the AOP values of the vehicle within each time period is calculated by using formula (8), and the coefficient of variation CV is used to describe the volatility of the AOP data. A time period with the smallest coefficient of variation CV is selected as a time period for vehicle load identification, and power distribution difference in this time period is used as a basis for vehicle load identification.

$$\bar{x} = \sum_{i=1}^{N} x_i \quad (8)$$

$$CV = \frac{1}{\bar{x}}\sqrt{\frac{1}{N}\sum_{i=1}^{N}(x_i - \bar{x})}$$

In the formula, N is a total number of samples of the AOP values in the time period, $x_i$ is a power of an ith sample, $\bar{x}$ is a mean value of the N samples, and CV is the coefficient of variation of the AOP values in the time period.

3. Identifying a No-Load Operating State

Figure 6:
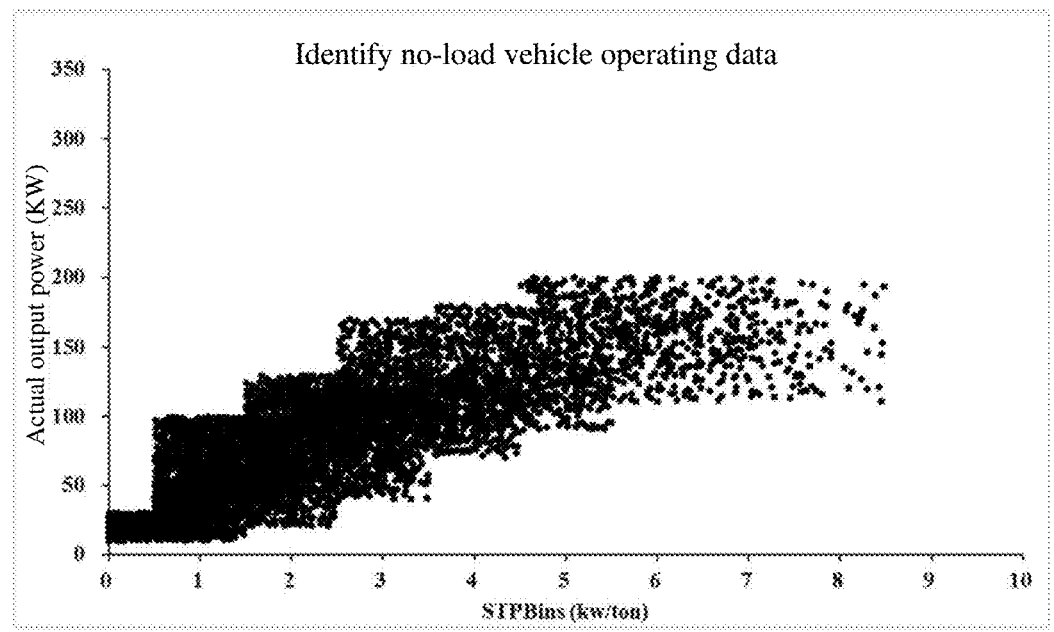
FIG. 6 is a schematic diagram of a screening result of vehicle actual power data under a no-load condition provided in an embodiment of the present application.

FIG. 6 is a schematic diagram of a screening result of vehicle actual power (AOP) data under a no-load condition provided in an embodiment of the present application, wherein a no-load operating state is identified by determining operation power intervals for different loads in a self-learning manner.

4. Establishing a Power and Vehicle Weight Relationship Model

Figure 7:
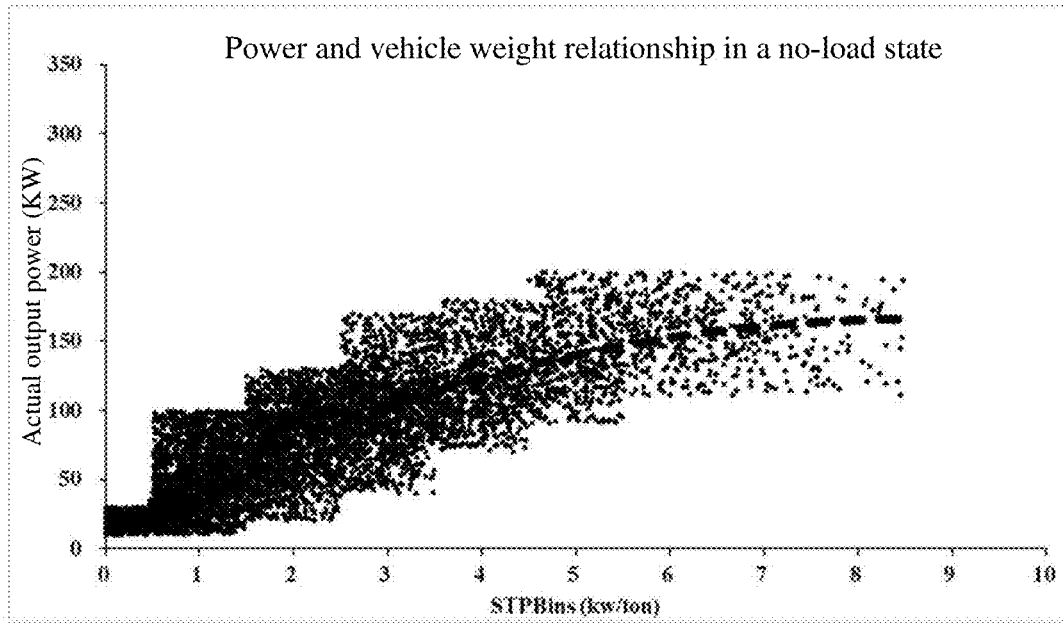
FIG. 7 is a schematic diagram of a relationship between a vehicle no-load state rate and a vehicle weight provided in an embodiment of the present application.

FIG. 7 is a schematic diagram of a relationship between a vehicle no-load state rate and a vehicle weight provided in an embodiment of the present application. Using a deep learning algorithm, a relationship between the vehicle weight and power distribution is simulated to build a power and vehicle weight relationship model. The simulation algorithm of the relationship model is shown in formula (9) below.

$$AOP = a \times STP^2 + b \times STP + c \quad (9)$$

In the formula, AOP is an actual output power, STP is a scaled tractive power, and a, b and c are parameters.

5. Building an AOP and Vehicle Load Algorithm System

With the increase of a vehicle load, an engine actual output power corresponding to the same scaled power increases obviously, and after simulation by a multiple data reconstruction algorithm, a power and vehicle load relationship model is built, as shown in the following formula.

$$AOP = a \times STP^2 + b \times STP + \lambda \Delta m \times STP + c \quad (10)$$

In the formula, AOP is the actual output power, STP is the scaled tractive power, a, b and c are parameters, $\Delta m$ is a load weight, and $\lambda$ is a mass correction coefficient (0.5-1.5).

6. Constructing a Method for Identifying an Overload Operating State

According to load weights and actual STP values of the vehicle in the standard full-load state, standard AOP values corresponding to the actual STP values of the vehicle in the standard full-load state are calculated based on the power and vehicle load relationship model shown in formula (10) above. According to a plurality of sets of standard AOP values and actual STP values in the full-load state, a power distribution curve of the vehicle in the standard full-load state is constructed. Vertical coordinates of the power distribution curve in the standard full-load state are the standard AOP values, and horizontal coordinates thereof are the actual STP values.

Step 24: comparing an AOP value of the vehicle during an actual operation process to a corresponding AOP value in the power distribution curve in the standard full-load state, and according to a comparison result, identifying whether the vehicle is overloaded.

In practical applications, when there is a need to detect whether the vehicle is overloaded at current time within the above-mentioned time period for vehicle load identification, an AOP value and a corresponding STP value of the vehicle at the current time are calculated; the above-mentioned power distribution curve in the standard full-load state is queried according to the STP value at the current time by using a data automatic correspondence model to obtain a standard AOP value corresponding to the STP value at the current time in the above-mentioned power distribution curve in the standard full-load state; and the AOP value at the current time is compared with the standard AOP value obtained from the query, and the vehicle is determined to be overloaded at the current time if the AOP value at the current time is greater than the standard AOP value, or the vehicle is determined to be not overloaded at the current time if the AOP value at the current time is not greater than the standard AOP value.

Figure 8:
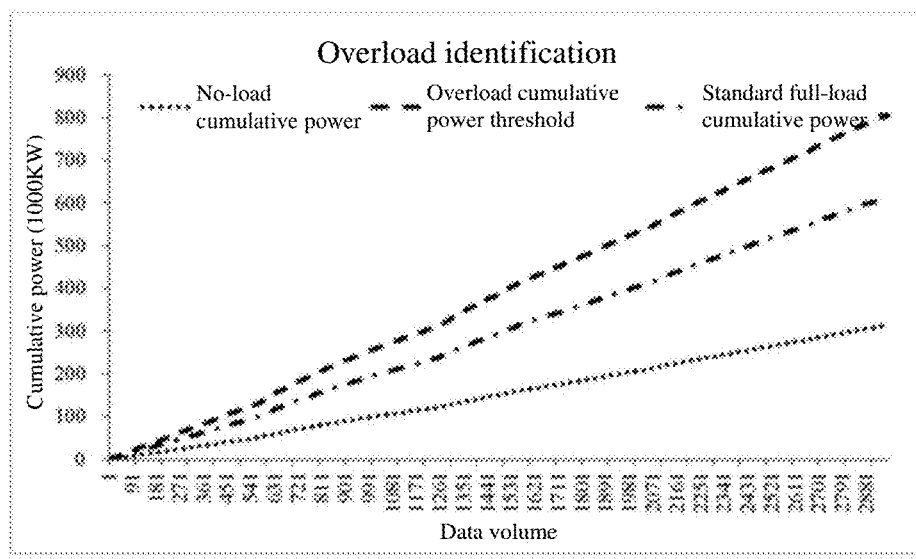
FIG. 8 is a schematic diagram of vehicle overload identification provided in an embodiment of the present application.

In practical applications, the vehicle may be determined to be overloaded after the vehicle is determined to be overloaded at multiple times (e.g., 3 times). For an overloaded vehicle, operation characteristic data of the overloaded vehicle may be mined at the same time. FIG. 8 is a schematic diagram of vehicle overload identification provided in an embodiment of the present application.

Parameter Correction Model for an Overload Operating State Identification Method If vehicle load data can be acquired, parameters in the load identification method based on vehicle self-learning can be corrected, including: (1) verification and adjustment of the load determination conditions; (2) parameter correction of the power and vehicle weight relationship model; and (3) parameter correction of the power and vehicle load relationship model.

1. Verification and Adjustment of the Load Determination Conditions

Figure 9:
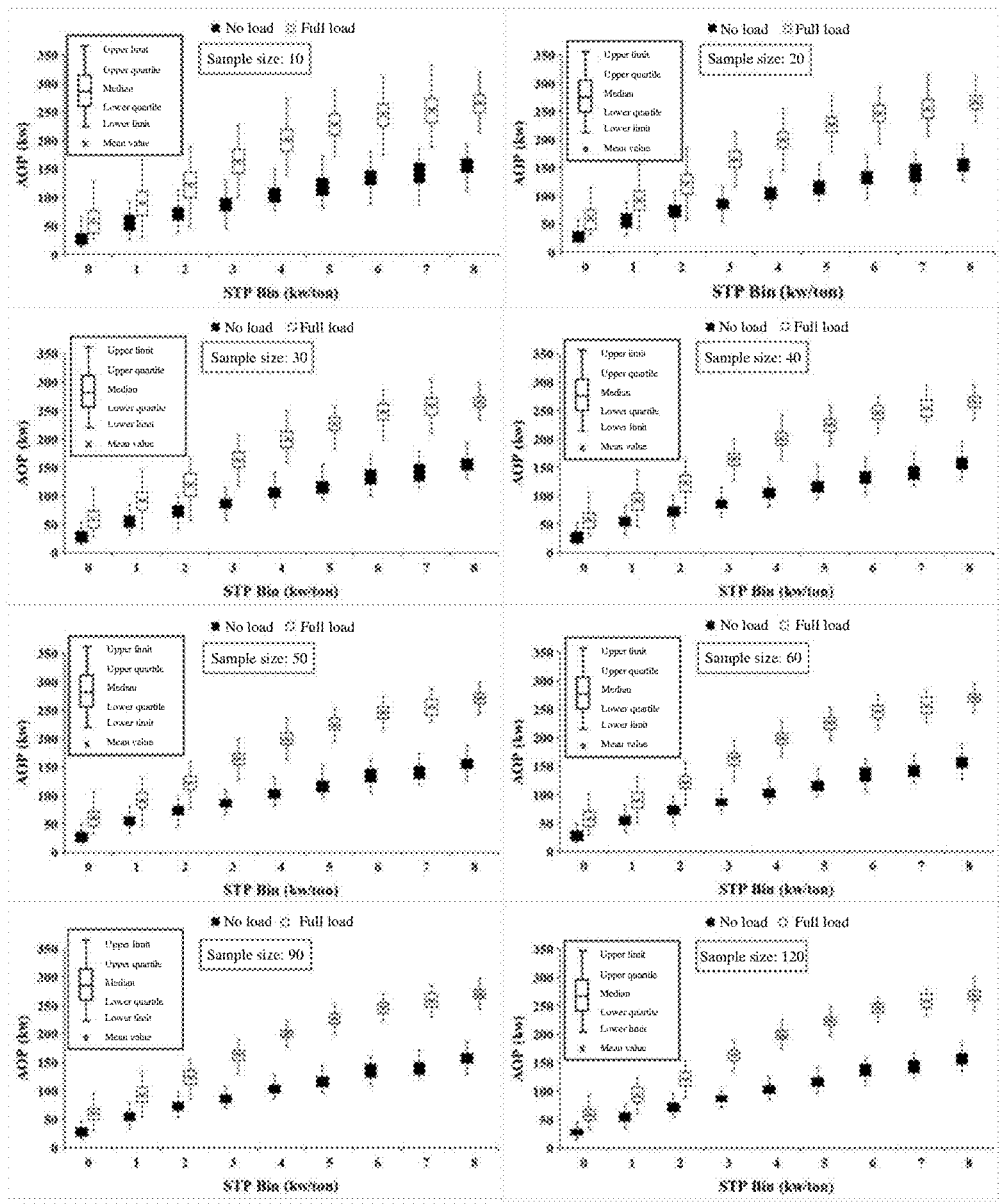
FIG. 9 is a schematic diagram of power distributions in different load states provided in an embodiment of the present application.

FIG. 9 is a schematic diagram of power distribution in different load states provided in an embodiment of the present application. Based on acquired actual operating data of the vehicle with known loads, power distributions of the vehicle under different load conditions are compared, the influence of a sample size within each STP Bins interval on the volatility is analyzed, and STP Bins with significantly separated power distribution are identified, and compared with the vehicle self-learning-based load determination conditions.

2. Parameter Correction of the Power and Vehicle Weight Relationship Model

Based on the acquired actual operating data of the vehicle with known loads, power distribution characteristics of the vehicle in the no-load operating state are analyzed, a power and vehicle weight relationship model is built, and multiple corrections are performed on parameters of the vehicle self-learning-based power and vehicle weight relationship model.

3. Parameter Correction of the Power and Vehicle Load Relationship Model

Based on the acquired actual operating data of the vehicle with known loads, power distribution characteristics of the vehicle in different load operating states are analyzed, a power and load relationship model is built, and the parameter $\lambda$ of the vehicle self-learning-based power and vehicle load relationship model is adjusted so that the model more accurately characterizes the actual operating state of the vehicle.

To sum up, in the context of traffic big data, the embodiment of the present application establishes a vehicle self-learning-based overload identification algorithm by using data from a heavy truck operation information monitoring platform, and proposes a multiple correction model for overload identification system parameters. Compared with the traditional vehicle load identification method, the present application can monitor loads of vehicles operating in the road network in real time without additional equipment, thus greatly improving the scope of overload identification.

The present application uses the real-time operating data of a vehicle with known loads to verify the accuracy of the vehicle no-load operating state identification method, proposes a parameter correction algorithm for the power and vehicle weight relationship model, and builds a parameter correction model of the power-vehicle load relationship model, which can improve the overload identification algorithm system and improve the accuracy of vehicle overload identification. The method of the embodiment of the present application can, based on the heavy truck operation information monitoring platform, show the operating states of overloaded vehicles in the road network in real time to provide convenience for oversize and overloading management.

It may be understood by those of ordinary skill in the art that the drawings are only schematic diagrams of an embodiment, and modules or processes in the drawings are not necessarily indispensable to implement the present application.

From the above description of implementations, those skilled in the art may clearly know that the present application can be achieved by virtue of software and a necessary general-purpose hardware platform. With this understanding, the technical solutions of the present application, in essence or for the part contributing to the prior art, may be embodied in the form of a software product, and the computer software product may be stored in a storage medium, such as an ROM/RAM, a magnetic disk, an optical disc or the like, and includes a number of instructions for causing a computer device (which may be a personal computer, a server, a network device or the like) to execute the method described in the embodiments or in parts of the embodiments of the present application.

The embodiments in the specification are described in a progressive manner. For the same and similar parts between the embodiments, reference may be made to each other. Each embodiment focuses on differences from other embodiments. In particular, an apparatus or system embodiment, which is substantially similar to a method embodiment, is described relatively simply, and for its relevant parts, reference may be made to parts of description of the method embodiment. The apparatus or system embodiment described above is merely schematic, wherein units described as separate components may be or may be not physically separate, and components shown as units may be or may be not physical units, i.e. may be located in one place, and may also be distributed in multiple network units. Some or all of the modules can be selected according to actual needs to achieve the object of the solution of the embodiment. They can be understood and implemented by those of ordinary skill in the at without creative work.

Described above are only preferred specific implementations of the present application, but the protection scope of the present application is not limited thereto, and all changes or substitutions that are readily conceivable to those skilled in the art within the technical scope disclosed by the present application should be encompassed within the protection scope of the present application. Thus, the protection scope of the present application should be defined by the claims.

The invention claimed is:

1. A power distribution and vehicle self-learning-based truck overload identification method, comprising:
acquiring load identification data of a vehicle, the load identification data comprising on-board diagnostic system data, global positioning system data, geographic information system data and vehicle information data;
calculating engine actual output power (AOP) values and scaled tractive power (STP) values of the vehicle according to the load identification data of the vehicle;
according to a plurality of sets of AOP values and STP values of the vehicle in a standard full-load state, constructing a power distribution curve of the vehicle in the standard full-load state; and
comparing an AOP value of the vehicle during an actual operation process to a corresponding AOP value in the power distribution curve in the standard full-load state, and according to a comparison result, identifying whether the vehicle is overloaded, so as to monitor operating states of overloaded vehicles in the road network in real time to achieve oversize and overloading management.

2. The method according to claim 1, wherein acquiring load identification data of a vehicle, the load identification data comprising on-board diagnostic system data, position coordinates data, geographic information system data and vehicle information data comprises:
acquiring, by an on-board diagnosis system, the on-board diagnostic system data of the vehicle, the on-board diagnostic system data comprising second-by-second operation time and traveling speed of the vehicle, and rotating speed and output torque information of an engine;
acquiring in real time, by a satellite positioning system, the position coordinates data of the vehicle, the position coordinates data comprising second-by-second longitude and latitude information;
acquiring, by a geographic information system, geographic information data of a road on which the vehicle operates, the geographic information data comprising slope, longitude and latitude, road grade and road network distribution information of the road on which the vehicle operates; and
acquiring, via a vehicle information database, specific attribute data of the vehicle, the specific attribute data comprising vehicle identification number, year of manufacture, manufacturer, total vehicle mass, emission standard, fuel type, engine model, engine displacement and maximum output power information.

3. The method according to claim 1, wherein the STP is a scaled tractive power, which is defined as a power output by an engine per ton of mass moved, and the STP is calculated by the following formula:

$$STP = \frac{\left[\frac{d}{dt}(KE + PE) + F^v_{rolling} + \frac{1}{2}\rho_a C_D A(v + v_w)^2 v\right]m}{f_{scale}} \quad (1)$$

wherein in formula (1), $$\frac{d}{dt}(KE + PE), F^v_{rolling}, \frac{1}{2}\rho_a C_D A(v + v_w)^2 v$$

represent a power required for a change in kinetic/potential energy of the motor vehicle, a power required to overcome rolling resistance, and a power required to overcome air resistance, respectively, wherein KE is the kinetic energy of the motor vehicle;

PE is the potential energy of the motor vehicle;

$F_{rolling}$ is the rolling resistance of the motor vehicle;

m is a mass of the motor vehicle (kg);

$f_{scale}$ is a mass scaling factor;

v is a traveling speed of the motor vehicle (m/s);

$v_w$ is a head-on wind speed of the motor vehicle (m/s);

$C_D$ is a drag coefficient, which is dimensionless;

A is a cross-sectional area of the vehicle (m²); and $\rho_a$ is an ambient air density, which is 1.207 kg/m³ at 20° C.;

after development according to physical formulas of the kinetic energy, the potential energy and the rolling resistance, formula (1) is transformed into formula (2):

$$STP = \frac{\left\{\frac{d}{dt}\left[\frac{1}{2}m(1+\varepsilon_i)v^2 + mgh\right] + C_g mgv + \frac{1}{2}\rho_a C_D A(v+v_w)^2 v\right\} m}{f_{scale}} \quad (2)$$

wherein $\varepsilon_i$ is a rolling mass coefficient, representing an equivalent mass of a rotating part in a power train of the motor vehicle;

h is an altitude (m) of a location where the motor vehicle is traveling;

g is an acceleration of gravity, which is 9.81 m/s²; and $C_R$ is a rolling damping coefficient (dimensionless), which is related to the road material and tire type and pressure, and is generally between 0.0085 and 0.016; and formula (2) is developed by calculating a derivative of a kinetic/potential energy part therein with respect to time t to obtain formula (3):

$$STP = \frac{mv[a(1+\varepsilon_i) + g(\text{grade}) + gC_R] + \frac{1}{2}\rho_a C_D A(v+v_w)^2 v}{f_{scale}} \quad (3)$$

wherein a is a traveling acceleration of the motor vehicle (m/s²); and grade is a road slope (the road slope is involved in the calculation when road network information includes slope information);

STP bin=n, ∀:STP∈ [n−0.5,n+0.5]   (4).

4. The method according to claim 3, wherein the STP values are divided into Bins intervals at equal intervals of 1 kw/t, the STP intervals being numbered −20, −19, . . . , −1, 0, 1, . . . 19, and 20, denoting STP intervals [−20.5, −19.5), [−19.5, −18.5), . . . , [−1.5, −0.5), [−0.5, 0.5), [0.5, 1.5), . . . , [18.5, 19.5), and [19.5, 20.5), respectively.

5. The method according to claim 1, wherein the AOP is an engine actual output power, and the AOP is calculated by the following formula:

$$\begin{cases} AOP = Fv \\ v = wr \\ w = 2\pi n/60 \Rightarrow AOP = \eta n T_r/9550 \\ T_r = Fr \\ T_n = \eta T_r \end{cases}$$

wherein in the formula, AOP is the engine actual output power (kw), F is a driving force (N), v is a linear velocity (m/s), w is an angular velocity (rad/s), r is an engine arm length (m), $\eta$ is an engine rotating speed (r/min), $T_n$ is an actual engine torque (Nm), $T_r$ is an engine reference torque (Nm), and $\eta$ is an engine actual torque output percentage (%).

6. The method according to claim 1, further comprising:

continuously collecting according to set time intervals and calculating the AOP and STP values of the vehicle, adjusting corresponding points of AOP and STP forward and backward within 10 seconds with a step of 1 second, calculating correlation coefficients r (STP, AOP) between the AOP and the STP at different corresponding points, respectively, and using a corresponding point with the largest correlation coefficient to denote an actual corresponding relationship between the AOP and the STP;

$$r(STP, AOP) = \frac{Cov(STP, AOP)}{\sqrt{Var(STP)Var(AOP)}} \quad (6)$$

wherein in the formula, r (STP, AOP) is the correlation coefficient between the STP and the AOP, Cov (STP, AOP) is a covariance between the STP and the AOP, Var (STP) is a variance of the STP, and Var (AOP) is a variance of the AOP.

7. The method according to claim 6, wherein denoising is performed on the AOP and STP values of the vehicle to determine a vehicle load identification condition; and with each Bins interval of STP as a time period, corresponding AOP values in each time period are determined according to the correlation coefficient r (STP, AOP), and a coefficient of variation CV of the AOP values of the vehicle within each time period is calculated, and a time period with the smallest coefficient of variation CV is selected as a time period for vehicle load identification;

$$\bar{x} = \sum_{i=1}^{N} x_i \quad (7)$$

$$CV = \frac{1}{\bar{x}}\sqrt{\frac{1}{N}\sum_{i=1}^{N}(x_i - \bar{x})}$$

in the formula, N is a total number of samples of the AOP values in the time period, xi is a power of the ith sample, $\bar{x}$ is a mean value of the N samples, and CV is the coefficient of variation of the AOP values in the time period.

8. The method according to claim 7, further comprising:

constructing a relationship model between a power of the vehicle and a vehicle weight by an algorithm of the relationship model shown in formula (8) below:

$$AOP = a \times STP^2 + b \times STP + c \quad (8)$$

wherein in the formula, AOP is an actual output power, STP is a scaled tractive power, and a, b and c are parameters.

9. The method according to claim 8, wherein according to a plurality of sets of AOP values and STP values of the vehicle in a standard full-load state, constructing a power distribution curve of the vehicle in the standard full-load state comprises:

constructing a power and vehicle load relationship model shown in formula (9) below:

$$AOP = a \times STP^2 + b \times STP + \lambda \Delta m \times STP + c \qquad (9)$$

wherein in the formula, AOP is the actual output power, STP is the scaled tractive power, a, b and c are parameters, $\Delta m$ is a load weight, and $\lambda$ is a mass correction coefficient; and according to load weights and actual STP values of the vehicle in the standard full-load state, calculating standard AOP values corresponding to the actual STP values of the vehicle in the standard full-load state based on the power and vehicle load relationship model shown in formula (9) above, and according to a plurality of sets of standard AOP values and actual STP values in the standard full-load state, constructing a power distribution curve of the vehicle in the standard full-load state, wherein vertical coordinates of the power distribution curve in the standard full-load state are the standard AOP values, and horizontal coordinates thereof are the actual STP values.

10. The method according to claim 9, wherein comparing an AOP value of the vehicle during an actual operation process to a corresponding AOP value in the power distribution curve in the standard full-load state, and according to a comparison result, identifying whether the vehicle is overloaded comprises:

when there is a need to detect whether the vehicle is overloaded at current time within the time period for vehicle load identification, calculating an AOP value and a corresponding STP value of the vehicle at the current time, querying the power distribution curve in the standard full-load state according to the STP value at the current time to obtain a standard AOP value corresponding to the STP value at the current time in the power distribution curve in the standard full-load state, comparing the AOP value at the current time with the standard AOP value obtained from the query, determining the vehicle is overloaded at the current time if the AOP value at the current time is greater than the standard AOP value, or determining the vehicle is not overloaded at the current time if the AOP value at the current time is not greater than the standard AOP value.

* * * * *